United States Patent [19]
Sorkin

[11] 3,853,391
[45] Dec. 10, 1974

[54] FABRICATION OF LIQUID CRYSTAL DEVICES

[75] Inventor: Howard Sorkin, Berkeley Heights, N.J.

[73] Assignee: RCA Corporation, New York, N.Y.

[22] Filed: Dec. 21, 1973

[21] Appl. No.: 427,347

[52] U.S. Cl. .......................... 350/160 LC, 117/223
[51] Int. Cl. ............................................. G02f 1/16
[58] Field of Search ............... 350/160 LC; 117/223

[56] References Cited
OTHER PUBLICATIONS

Janning: "Thin Film Surface Orientation for Liquid Crystals," Applied Physics Letters, Vol. 21, pp. 173–174, Aug. 15, 1972.

*Primary Examiner*—Edward S. Bauer
*Attorney, Agent, or Firm*—H. Christoffersen; M. Y. Epstein

[57] ABSTRACT

A layer of magnesium fluoride is slant evaporated onto a substrate to provide an oriented microstructure thereon capable of causing sympathetic alignment of liquid crystal molecules. A process is used in which particles from a heated mass of magnesium fluoride travel along straight line paths directly from the heated mass to the substrate.

2 Claims, 2 Drawing Figures

PATENTED DEC 10 1974 3,853,391

FABRICATION OF LIQUID CRYSTAL DEVICES

This invention relates to liquid crystal devices, and particularly to liquid crystal devices of the type having surface aligned liquid crystal molecules.

One type of recently developed liquid crystal device, see U.S. Pat. No. 3,731,986, issued May 8, 1973, to Fergason (the disclosure thereof being incorporated herein), employs what is known as a "twisted" nematic liquid crystal material. Such devices comprise two closely spaced apart substrates sandwiching a thin film of liquid crystal material therebetween. The inner surfaces of the substrates are treated, as by directional rubbing, to influence and cause alignment of the liquid crystal molecules immediately adjacent to the substrates. In the "twisted" type device, the inner surfaces are so oriented with respect to one another that while adjacent molecules of the liquid crystal material are generally aligned with one another, the direction of the axis of alignment of the molecules gradually rotates or "twists" through some angle, e.g., 90°, from one substrate to the other. This angular rotation or "twist " of the axis of alignment of the molecules causes a corresponding angular rotation of the plane of polarization of linearly polarized light directed through the liquid crystal film. Moreover, by selectively applying an electric field through different portions of the film, these portions are "untwisted," with the result that the polarized light passing therethrough is not rotated. Removal of the electric field allows the liquid crystal material to return to its twisted state.

As noted, to obtain the desired alignment of the liquid crystal molecules at the substrate surfaces, it is necessary to "influence" or direct the alignment of the molecules at the substrates. This is done by treating the inside surfaces of the substrates to provide thereon some sort of "grained" microstructure having a definite axis of orientation along which the liquid crystal molecules align themselves. By arranging the microstructure orientation of the two substrates at a preselected angle with respect to one another, the proper twist through the liquid crystal film is obtained. In other types of devices, such as the "guest-host" type described in U.S. Pat. No. 3,551,026, issued on Dec. 29, 1970, the substrate surface orientations are disposed parallel to one another, and no twist is induced through the liquid crystal material.

One means to provide such an oriented microstructure on the substrate surfaces is the use of a process described in an article by John L. Janning, entitled "Thin Film Surface Orientation for Liquid Crystals," Applied Physics Letters, Vol. 21, No. 4, 15 Aug., 1972, at page 173, the disclosure of said article being incorporated herein. In this process, certain inorganic materials such as aluminum, gold, and silicon monoxide, are vacuum deposited to a thickness of 100A or less onto the substrates using a vapor deposition angle of approximately 5° to the plane of the surfaces to be coated, such process being referred to as "slant evaporation."

While the process described in the article is operative, it is found that certain disadvantages are present when the process is used as described. For example, the metals disclosed in the article, even when deposited at very small thicknesses, are not transparent, or at least not significantly transparent, and are thus of limited utility in liquid crystal devices of the "transmissive" type, i.e., devices in which it is intended that light pass entirely therethrough with as little attenuation of brightness as possible. While silicon monoxide is transparent, experiments have shown that it is somewhat difficult to deposit it uniformly and reproducibly.

Additionally, for the purpose of hermetically sealing the device envelope, recognized as being quite important for protecting the liquid crystal material from contamination, it is presently necessary to expose the "slant evaporated" substrates to a relatively high temperature sealing operation. This, it is found, frequently affects the chemical or physical characteristics of the evaporated material to the extent that defective devices result.

Figure 1:
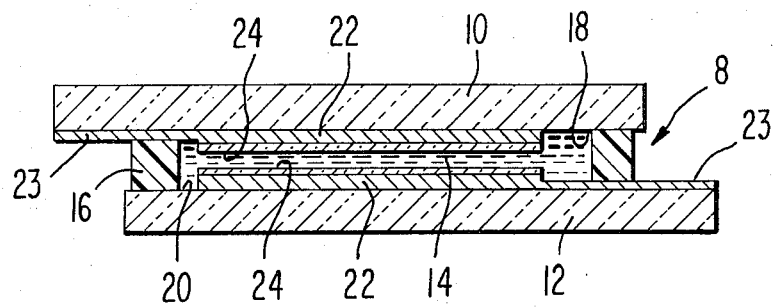
FIG. 1 shows a liquid crystal device, in cross-section, fabricated in accordance with this invention.

With reference to the drawing, a liquid crystal device 8 is shown comprising a pair of substrates 10 and 12, a film 14 of a liquid crystal material therebetween, and a bead 16 of fused glass hermetically sealing the liquid crystal material between the two substrates. The spacing between the substrates 10 and 12 is in the order of one-half mil (about 13 micrometers), the spacing being controlled either by the use of spacer members (not shown) between the substrates or by the glass bead 16 itself. Each of the inside surfaces 18 and 20 of the two substrates 10 and 12, respectively, is provided with an electrode 22 comprising a thin coating of a conductive material, e.g., tin oxide, and extension 23 thereof extending along the substrate surface to outside the bead 16 where electrical connection means, not shown, can be made thereto. Generally, while not shown herein, one or both of the electrodes 22 is patterned, i.e., partially removed to expose the underlying substrate surface, in the form of some image to be displayed.

The device 8 utilizes the twisted mode of liquid crystal material operation. To this end, each inside surface 18 and 20 of the two substrates 10 and 12 and the surfaces of the electrodes 22 are treated to provide thereon an oriented microstructure which can align molecules of the liquid crystal. By "oriented microstructure" is meant to include microscopic grooves, ridges, scratches, peaks and valleys, and the like, which are generally parallel to one another and which are capable of causing sympathetic alignment of the liquid crystal molecules.

In accordance with this invention, such substrate oriented microstructures comprise a thin layer 24 of magnesium fluoride ($MgF_2$) covering theelectrodes 22 on the substrates 10 and 12 and the portions of inside surfaces 18 and 20 of the substrates otherwise exposed through the electrodes. The magnesium fluoride layer is provided by an evaporation process, described more fully hereinafter, substantially in accordance with the process described in the aforecited article by Janning. The material, magnesium fluoride is well known for use in an anti-reflective coating for optical glasses. As known magnesium fluoride layers adhere quite well to glass and have stable crystalline structures.

While not known for sure, it is believed that the "slant evaporation" process results in a large number of tiny, parallel ridges of the deposited material being formed on the substrate surfaces, the word "layer" being used to designate the deposited material, whether it is continuous from ridge to ridge or not. These parallel ridges provide an oriented microstructure along which the liquid crystal molecules align themselves.

The fabrication of the device 8 is as follows. Starting with the two substrates 10 and 12 each having an electrode 22 and an electrode extension 23 thereon, provided by known means, a bead of glass frit is deposited along the edges of one of the substrates, as by silk screening. Then, using a vacuum vapor deposition at "glancing angles", i.e., a "slant evaporation" process such as described by Janning, the two substrates are coated on the inside surfaces thereof with the layer of magnesium flouride.

Figure 2:
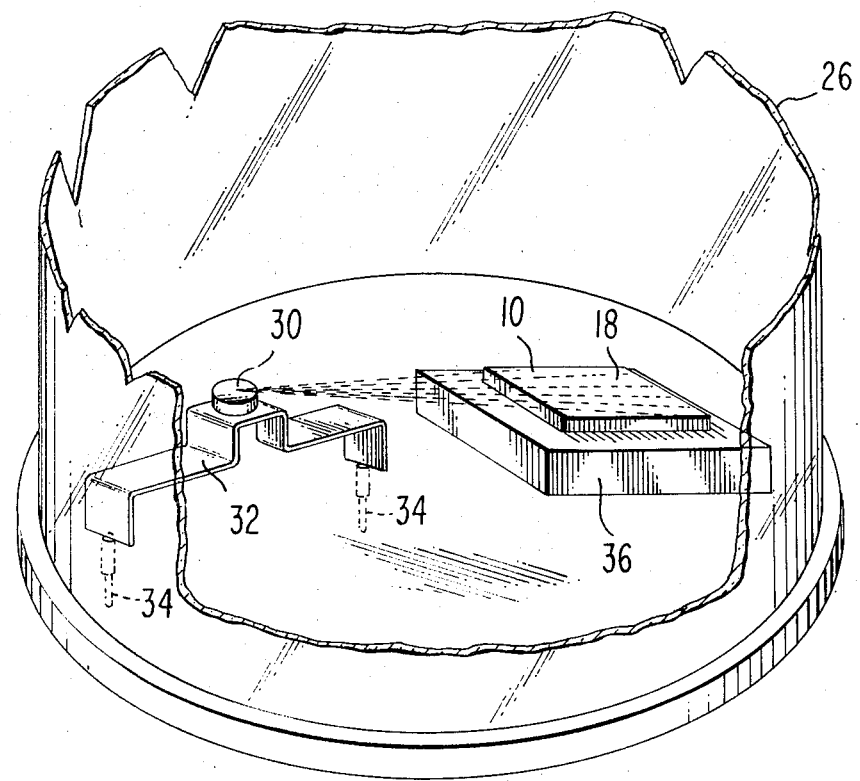
FIG. 2 shows, in perspective and partly broken-away, apparatus for slant evaporating a coating on a substrate.

Vacuum evaporation processes are generally known. Thus, for example, as shown in FIG. 2, a bell jar 26 is used in which is disposed a source of the material to be deposited, in this case a pellet 30 of compacted magnesium fluoride crystals, and a heater strip 32 of an electrical resistive material, e.g., molybdenum, on which the pellet 30 is mounted. Electrical leads 34 extend through the base of the jar 26 and are connected to the ends of the strip 32. The substrates (only one of which, 10, is shown) are mounted on a support 36 within the jar 26, the surface 18 of the substrate 10 being disposed substantially parallel with the lines of travel of particles from the pellet 30 to the substrate 10 to provide the proper "slant evaporation" conditions.

In the evaporation process, the jar 26 is evacuated, and the pellet 30 is heated to a temperature in the order of 1,200°C.

As previously noted, the use of magnesium fluoride as an anti-reflective coating is known. I discovered, however that the method of depositing the magnesium fluoride layer is critical with respect to the ability of the layer to cause sympathetic alignment of the liquid crystal molecules. Thus, as shown in FIG. 2, the source 30 and the substrate 10 are in direct lines of sight of one another, and vapor particles from the source 30 can travel along straight lines directly from the source 30, i.e., the actual heated mass of magnesium fluoride, to the substrate. Liquid crystal device substrates coated by such direct line of sight evaporation processes are operable. Conversely, in experiments in which the source material itself is not directly "visible" by the substrate to be coated, as by disposing the source material in a generally closed container having an orifice directed at the substrate, operable devices do not result.

It is generally known (see, for example, *Vacuum Deposition of Thin Films*, by L. Holland, John Wiley and Sons, 1960, beginning at page 278) that certain physical properties of magnesium fluoride layers, such as the abrasive resistance thereof, are dependent upon how the material is deposited. However, the prior art does not suggest, nor is it known to me, why the means of depositing the magnesium fluoride layer is critical in liquid crystal devices. In any event, I discovered experimentally that direct line of sight evaporations, in which the source material itself is directly "visible" by the substrate, is necessary. While not done experimentally, it would at least appear, based upon the discussion in the aforementioned reference by Holland, that any deposition process resulting in a layer which is not a "slow fluoride", i.e., a layer which is not deposited either at a slow rate of deposition or with molecules of low thermal velocity, would have characteristics similar to those obtained using direct line of source depositions. Therefore, the term "fast fluoride" is coined to designate processes such as discussed in Holland resulting in the avoidance of "slow fluoride" layers. The use of direct line-of-sight depositions as described herein fits within this definition since, for one thing, no obstacles are present for impeding and reducing the thermal velocity of the particles.

It is noted that, while the Janning article describes the provision of various layers having thicknesses less than 100A, it is found that deposited layers of magnesium fluoride having somewhat higher thicknes, e.g., at least up to 1,000A, can be used. Also, while Janning describes the use of small vapor deposition angles, e.g., in the order of 5°, it is found that somewhat larger deposition angle, e.g., at least up to 35°, can be used.

Having slant evaporated the layers 24, the two substrates are then properly oriented with respect to one another, both with respect to alignment of the two electrodes 22 and angular displacement of the directions of orientation of the magnesium fluoride layers on the two substrates. Also, the two substrates are contacted with one another along the glass frit bead and, while applying compressive pressure to hold the substrates together, the assembly is heated in air to a temperature, dependent upon the glass frit used and generally in the range of 380°C to 540°C, to soften the bead and fusion seal the substrates together. The fused joint hermetically seals together the two substrates, a space, however, being provided therebetween to receive the liquid crystal material.

Having provided the cell enclosure, an important step, I discovered, is to flush or rinse out the interior of the cell with a solvent, e.g., water, and preferably with an organic solvent, e.g., methanol. The actual function of the flushing step is not known. Apparently, during the previous sealing step, at elevated temperatures, some substance reaches the surface of the glass substrate, whether by migration to the surface from within the glass, or by deposition on the glass surface, and this substance, whatever it is, adversely reacts with the liquid crystal material later introduced into the cell. In any event, flushing the interior of the cell prior to filling it with a liquid crystal material results in a higher yield of operable devices. The rinsing material is preferably completely removed prior to the liquid crystal filling step and to this end, methanol, which is completely removed simply by heating the cell to a temperature slightly above the boiling point of methanol (75°C), is preferred.

Thereafter, using a process such as that described in U.S. Pat. No. 3,701,368, issued to H. Stern on Oct. 31, 1972, the liquid crystal material is introduced into the space between the substrates, and the filling ports hermetically sealed off.

By virtue of the angular displacement of the microstructures on the inside surfaces of the two substrates, a corresponding angular rotation of the axis of alignment of the molecules of the liquid crystal material, i.e., the "twist effect," is automatically obtained. In the usual case, the substrate microstructures are oriented at an angle of 90° with respect to one another, a twist of 90° thus being produced through the liquid crystal material. As known, the "twist effect" can be induced in any number of known liquid crystal materials possessing positive dielectric anisotropy. Examples of such materials are provided in the aforecited patent to Fergason and in an article by Schadt and Helfrich, page 127 of Applied Physics Letters, Vol. 18, 15 Feb., 1971.

What is claimed is:
1. A liquid crystal device comprising:
an enclosure and a liquid crystal material therewithin,
a surface of said enclosure having an electrode thereon, and
a layer of magnesium fluoride on said electrode providing an oriented microstructure along with molecules of said liquid crystal material sympathetically align.
2. The device of claim 1 in which said layer is a fast fluoride.

* * * * *